United States Patent
Shaver et al.

(10) Patent No.: US 7,814,345 B2
(45) Date of Patent: Oct. 12, 2010

(54) GATE DRIVE VOLTAGE SELECTION FOR A VOLTAGE REGULATOR

(75) Inventors: Charles N. Shaver, Cypress, TX (US); Howard Leverenz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 690 days.

(21) Appl. No.: 11/680,524

(22) Filed: Feb. 28, 2007

(65) Prior Publication Data

US 2008/0209236 A1 Aug. 28, 2008

(51) Int. Cl.
*G06F 1/00* (2006.01)
*G06F 1/26* (2006.01)
*G05F 3/16* (2006.01)
*H03K 17/00* (2006.01)
*H03K 17/687* (2006.01)
*H02M 7/5383* (2007.01)
*H02M 3/335* (2006.01)

(52) U.S. Cl. ............... 713/300; 713/320; 323/223; 323/225; 327/407; 327/427; 363/74; 363/80

(58) Field of Classification Search ........... 713/300, 713/320; 323/223, 225; 327/407, 427; 363/74, 363/80

See application file for complete search history.

(56) References Cited

U.S. PATENT DOCUMENTS

| | | | |
|---|---|---|---|
| 5,400,239 A * | 3/1995 | Caine | 363/67 |
| 6,097,178 A | 8/2000 | Owen | |
| 6,525,599 B2 | 2/2003 | Nguyen et al. | |
| 6,853,174 B1 | 2/2005 | Inn | |
| 6,914,419 B2 | 7/2005 | Katayama | |
| 7,200,762 B2 * | 4/2007 | Pearl | 713/300 |
| 7,304,464 B2 * | 12/2007 | Weng et al. | 323/285 |
| 7,345,463 B2 * | 3/2008 | Isham | 323/285 |
| 7,352,161 B2 * | 4/2008 | Tiew et al. | 323/285 |
| 7,535,122 B2 * | 5/2009 | Visairo-Cruz et al. | 307/80 |
| 2003/0016545 A1 | 1/2003 | Jutras et al. | |
| 2004/0117673 A1 * | 6/2004 | Arabi et al. | 713/300 |
| 2006/0170401 A1 * | 8/2006 | Chen et al. | 323/273 |
| 2006/0221528 A1 * | 10/2006 | Li et al. | 361/100 |

* cited by examiner

*Primary Examiner*—Stefan Stoynov

(57) ABSTRACT

A system comprises a load and a voltage regulator. The voltage regulator is configured to select a gate drive signal from among a plurality of input voltages. The voltage regulator is configured to use the selected gate drive signal to turn on a power transistor to produce a regulated voltage for the load.

12 Claims, 3 Drawing Sheets

GATE DRIVE VOLTAGE SELECTION FOR A VOLTAGE REGULATOR

BACKGROUND

Electronic systems consume electrical power. Electrical power carries a financial cost. For this and other reasons, systems that consume less power are desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
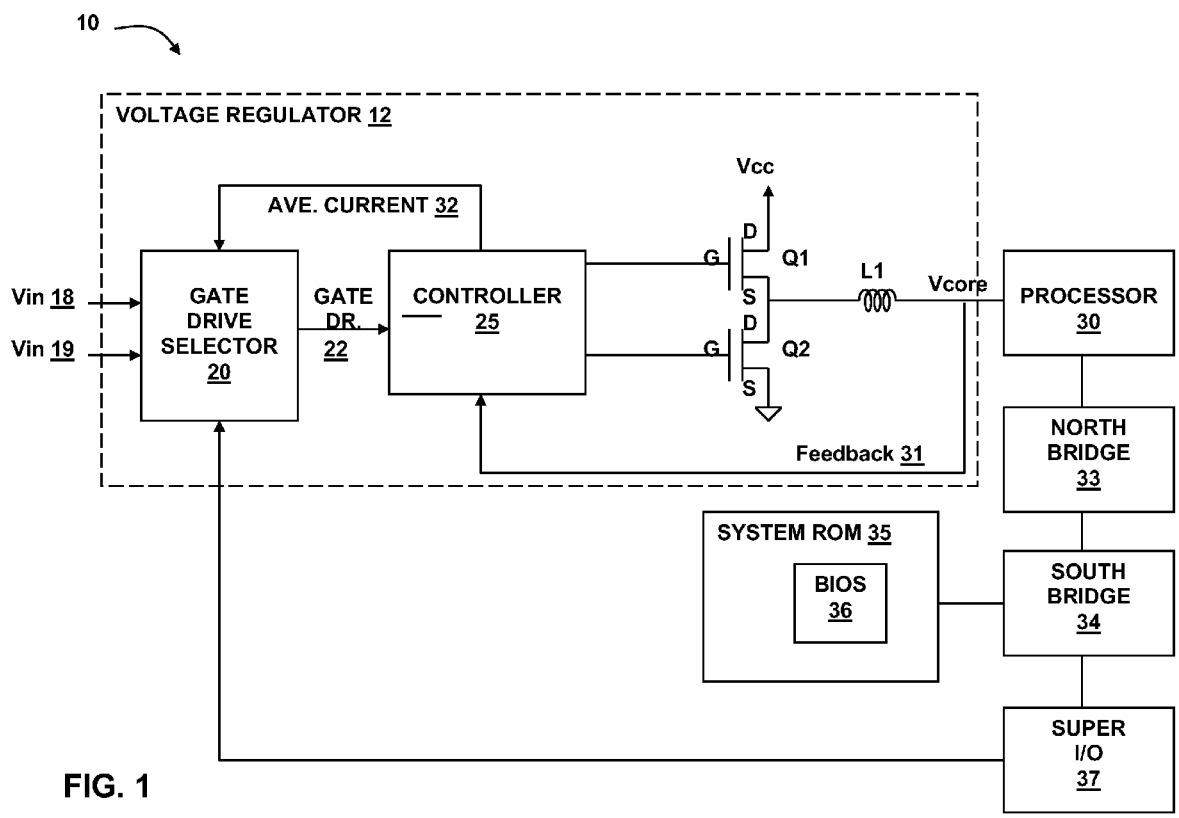
FIG. 1 shows a system in accordance with various embodiments.

FIG. 1 illustrates a system 10 in accordance with various embodiments. In at least some embodiments, system 10 comprises a computer. In the example of FIG. 1, system 10 comprises a voltage regulator 12 coupled to a processor 30. The voltage regulator 12 receives an input voltage (Vcc) and produces a regulated voltage, Vcore, for the processor 30. The Vcore regulated voltage provides the main operating voltage for the processor in accordance with at least some embodiments. The voltage of Vcore is application specific. In some embodiments, Vcore is less than or equal to 1.5V (e.g., 825 millivolts, 850 millivolts, 900 millivolts, etc.).

The system 10 also comprises a "north bridge" 33 coupled to the processor 30 and a "south bridge" 34 coupled to the north bridge 33. A super input/output (I/O) 37 and a system read only memory (ROM) 35 are also provided and coupled to the south bridge 34. The system ROM 35 comprises system firmware that is executable by processor 30. In at least some embodiments, the system firmware comprises a basic input/output system (BIOS). In some embodiments, the super I/O 37 generates a BIOS gate drive select signal 39 that is provided to the gate drive selector 20.

The voltage regulator 12 comprises a gate drive selector 20 coupled to a controller 25. The controller 25 couples to one or more power transistors. In the example of FIG. 1, a pair of power transistors Q1 and Q2 are shown, although the number of power transistors can be different in other embodiments. In at least some embodiments, each power transistor Q1, Q2 comprises a field effect transistor (FET). Transistor Q1 has its drain (D) coupled to Vcc (e.g., 12V). The source (S) of transistor Q1 couples to the drain of transistor Q2 and the source of transistor Q2 couples to ground. The common node 26 between the Q1 and Q2 comprising the source and drain of transistors Q1 and Q2, respectively, provides an output voltage. Node 26 couples to one terminal of an indicator L1, the other terminal of which provides the Vcore voltage that is provided to the processor 30. A feedback line 31 from the Vcore voltage line is provided back to the controller 25 as a feedback signal for use by the controller 25 in controlling the duty cycle of transistors Q1 and Q2 to thereby regulate the output voltage of the voltage regulator 12.

The gate drive selector 20 provides a gate drive signal 22 (e.g., a voltage) to the controller 25. The controller 25 uses the gate drive signal 22 to turn on each of the power transistors Q1 and Q2 in an alternating fashion. That is, in at least some embodiments, the power transistors Q1 and Q2 are not both "on" (i.e., conducting) simultaneously. The controller 25 dynamically adjusts the duty cycle with which the transistors Q1 and Q2 are selectively turned on and off. The voltage provided to the gates (G) of the transistors Q1 and Q2 to turn the transistors on is substantially equal to, or derived from, the gate drive signal 22.

In accordance with various embodiments, the gate drive selector 20 selects a voltage among a plurality of input voltages to provide as the gate drive signal 22 to the controller 25. In the example of FIG. 1, two input voltages 18 and 19 are shown from which the gate drive selector 20 can select for the gate drive signal 22. In this example, voltage 18 comprises 5V and voltage 19 comprises 12V. In other embodiments, additional or different voltages are possible. Some systems such as computers already have 5V and 12V generated therein for other purposes. In such embodiments, using voltages that are already present for the selection of the gate drive signal reduces the number of the components needed for the system compared to what might be required if new voltages were generated.

In at least some embodiments, the gate drive selector 20 selects the voltage from among voltages 18 and 19 to use as the gate drive signal 22 based on the current draw of a load (e.g., the processor 30). The controller 25 generates an "average current" output signal 32 that is indicative of the average current draw of the processor 30. In some embodiments, the average current output signal 32 comprises a voltage level which is proportional to the average current draw of the processor over a period of time (e.g., 1 millisecond). The average current output signal 32 from the controller 25 is provided to the gate drive selector 20 of the voltage regulator 12. The gate drive selector 20 selects one of the input voltages 18 and 19 for the gate drive signal 22 based on the voltage level of the average current output signal from the controller 25. The selection of the gate drive signal 22 by the gate drive selector 20 can occur during system initialization and/or during run-time. Further the gate drive selector 20 can change the gate drive signal 22 one or more times during run-time. Thus, as the current draw by the processor 30 changes, the gate drive selector 20 can respond by selecting different gate drive signals.

In some embodiments, the BIOS 36 reads one or more model specific registers (MSRs) from the processor 30 during system initialization. The information read from such registers informs the BIOS 36 as to whether the processor is capable of high current operation compared to other types of processors. In such embodiments, the BIOS 36 causes the BIOS gate drive select signal 39 to be asserted by the super I/O 37 based on the detected type of processor 30 installed in the system 10. In some embodiments, if the processor is a high current type of processor, the BIOS 36 causes the BIOS gate drive select signal 39 to be high. If the processor is a low current type of processor, the BIOS 36 causes the BIOS gate drive select signal 39 to be low.

In some embodiments, the BIOS 36 causes the BIOS gate drive select signal 39 to be asserted to cause the gate drive selector 20 to select a specific input voltage as the gate drive signal 22. In other embodiments, the BIOS 36 does not cause the BIOS gate drive select signal 39 to be asserted and, instead, the gate drive selector 20 receives the average current signal 32 from the controller 25 by which the gate drive selector 20 selects the input voltage 18, 19 as the gate drive signal 22. In still other embodiments, the BIOS 36 activates the BIOS gate drive select signal 39 during system initialization to initially cause a specific input voltage to be selected as the gate drive signal and, after initialization, the gate drive selector 20 uses the average current signal 32 (not the BIOS gate drive select signal 39) to select the appropriate gate drive signal 22.

Figure 2:
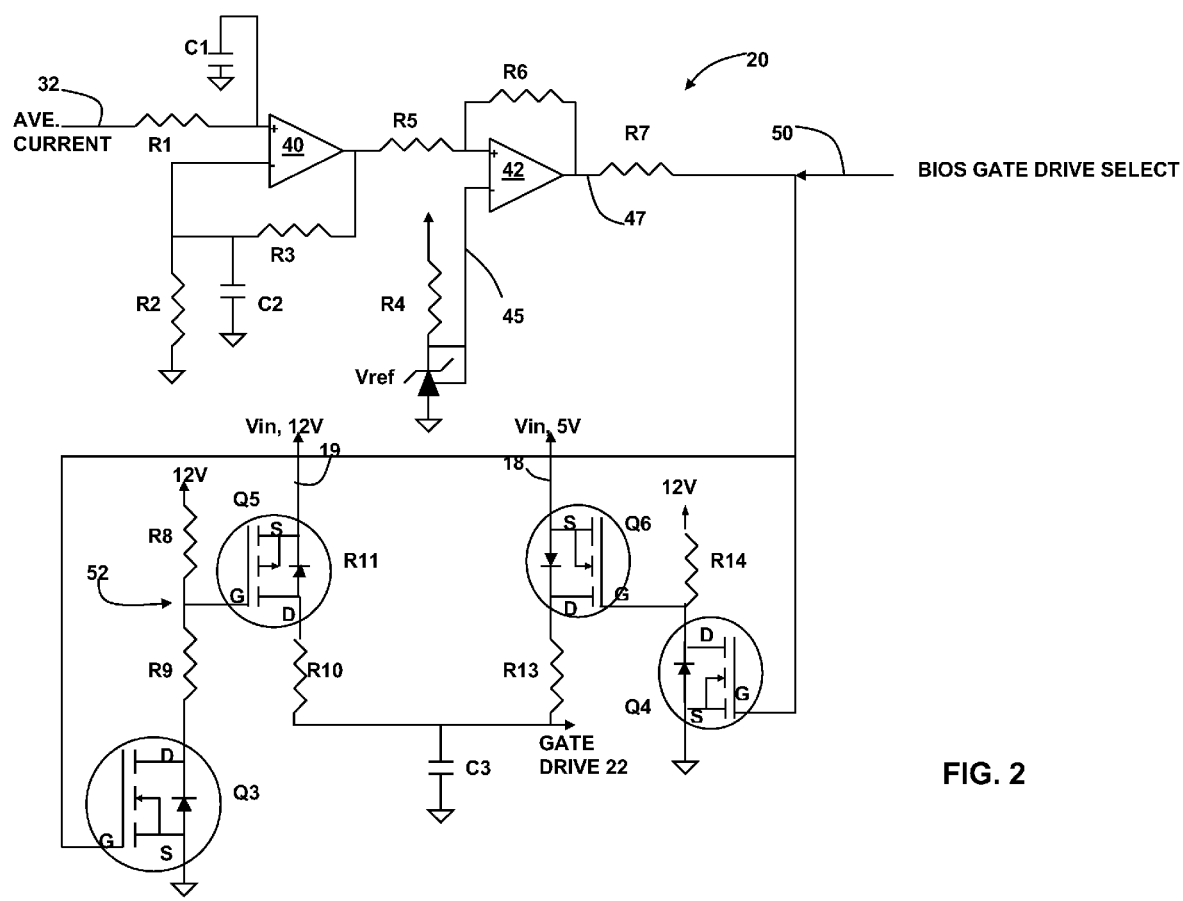
FIG. 2 shows a gate drive selector usable in the system of FIG. 1 in accordance with various embodiments.

FIG. 2 illustrates an embodiment of the gate drive selector 20. As shown, gate drive selector 20 comprises operational amplifiers ("op amps") 40 and 42, capacitors C1, C2 and C3, voltage reference Vref, transistors Q3-Q6, and resistors R1-R10, R13, and R14. Op amp 40 is configured as a non-inverting amplifier, the gain of which is dictated by the relative values of resistors R3 and R2 (e.g., 1+R3/R2). Op amp 42 is configured as a comparator to compare the amplified output signal from op amp 40 to a reference voltage 45 produced by voltage reference Vref. The comparator circuit comprising op amp 42 also implements hysterisis to prevent the output signal 47 from op amp 42 from oscillating or otherwise rapidly changing state if the output signal form op amp 40 is at, or close to, the voltage produced by the Vref 45.

If the output signal from op amp 40 plus the hysterisis voltage applied through resistor R6 is greater than the Vref's reference voltage 45, the output of op amp 42 is forced to a logic high state; otherwise the output of op amp 42 is forced to a logic low state. The output signal form op amp 42 is labeled in FIG. 2 as the gate drive select signal 50. The BIOS gate drive select signal 39 from the super I/O 37 also couples to the gate drive select signal line 50. In accordance with at least some embodiments, the logical state (high or low) of the gate drive select signal 50 dictates whether the gate drive signal 22 (FIG. 1) provided by the gate drive selector 20 to the controller 25 is selected to be one or the other of the input voltages 18 and 19. In the example of FIG. 2, if the gate drive select signal 50 is high, the input voltage 19 is selected as the gate drive signal 22, whereas if the gate drive select signal 50 is low, the input voltage 18 is selected as the gate drive signal 22.

Referring still to FIG. 2, transistor Q5 comprises a P-channel FET and transistor Q6 comprises an N-channel FET. As a P-channel FET, transistor Q5 turns on when the gate-to-source voltage (Vgs) of Q5 is less than a threshold negative value (i.e., more negative than the negative threshold value). For example, if the threshold is −1V, then the gate-to-source voltage of Q5 must be less than −1V (e.g., −4V). The specific threshold varies from transistor to transistor and is thus application specific. As an N-channel FET, transistor Q6 turns on when the gate-to-source voltage (Vgs) is greater than a threshold positive value. That is, for the transistor Q6 to turn on, the gate of Q6 must be greater than the voltage on the source by more than a threshold amount.

When the gate drive select signal 50 is high, both of transistors Q3 and Q4 are turned on. Resistors R8 and R9 are connected in series from 12V (or other suitable voltage) to the drain of Q3. Resistors R8 and R9 comprise a voltage divider. In some embodiments, resistor R9 has a resistance that is twice that of resistor R8 and thus the voltage at the connection node 52 between resistors R8 and R9 is two-thirds of 12V (the voltage connected to resistor R8), or 8V. The source of Q5 is connected to input voltage 19, which is 12V in this example. Thus, with Q3 turned on, the gate of Q5 is at 8V and the source is at 12V. Consequently, the gate-to-souce voltage is −4V (8V-12V) which is less than a threshold voltage for the P-channel transistor Q5 and thus sufficient to turn on Q5. With Q5 turned on, the input voltage 19 (12V) is provided through resistor R10 as the gate drive signal 22.

The source of transistor Q4 is connected to ground. With transistor Q4 also turned on by a high state of the gate drive select signal 50, the gate of the N-channel transistor Q6 is low and thus Q6 is off and the 5V input voltage 18 is blocked from being provided as the gate drive signal 22. Thus, when the gate drive select signal 50 is high, the gate drive signal 22 becomes the input voltage 19 (12V) in the illustrative embodiment of FIG. 2.

When the gate drive select signal 50 is low, both of transistors Q3 and Q4 are turned off. With Q4 off, the gate of Q6 has a voltage level of 12V (or other suitable voltage) through resistor R14. The source of Q6 is connected to input voltage 18 (5V). Thus, the gate-to-source voltage of Q6, when Q4 is off (i.e., when the gate drive select signal 50 is low), is 7V (12V-5V) which is greater than the applicable threshold voltage for Q6 and thus sufficient to turn on Q6. With Q6 turned on, the input voltage 18 (5V) is provided through Q6 as the gate drive signal 22.

With Q3 off (which is the case when the gate drive select signal 50 is low), the gate voltage of Q5 is 12V. The source voltage for Q5 is also 12V. Thus, the gate-to-source voltage for Q5 is 0V (12V-12V) which is greater than the negative threshold for Q5 and thus Q5 is off thereby preventing 12V from being provided as the gate drive signal 22. Thus, when the gate drive select signal 50 is low, the gate drive signal 22 becomes 5V in the illustrative embodiment of FIG. 2.

Table I provides an illustrative set of values for various of the components shown in FIG. 2 as well as part numbers for other components. Other component values are possible as well in other embodiments.

TABLE I

Component values

| Component | Value/Part no. |
|---|---|
| C1 | 10 nF |
| C2 | 100 pf |
| C3 | 1 μF |
| R1 | 8.2 k'Ω |
| R2 | 7.5 k'Ω |
| R3 | 80.6 k'Ω |
| R4 | 2.49 k'Ω |
| R5 | 5.1 k'Ω |
| R6 | 40.2 k'Ω |
| R7 | 0 'Ω |
| R8 | 10 k'Ω |
| R9 | 20 k'Ω |
| R10 | 4.7 'Ω |
| R13 | 2.2 'Ω |
| R14 | 10 k'Ω |

TABLE I-continued

Component values

| Component | Value/Part no. |
| --- | --- |
| Q3 | 2N7002_NL |
| Q4 | 2N7002_NL |
| Q5 | APM9932 |
| Q6 | APM9932 |
| Vref | TL431 |

The gate drive selector 20 operates, at least in part, to improve the efficiency of the controller 25. As used herein, the "efficiency" of the controller is defined as Pout/Pin. Pout is the Vcore voltage to the processor 30 multiplied by the current to the processor. Pin comprises the gate drive power (the voltage on the gate drive signal 22 multiplied by the gate drive current) plus the power flowing in to the drain of Q1 (Vcc multiplied by the current flowing into the drain of Q1).

The efficiency of the controller 25 varies with the current being provided to the load (e.g., the processor 30). The efficiency of the controller 25 is also based on the voltage level of gate drive signal 22. At relatively low current levels, the efficiency of the controller 25 is greater if the gate drive signal 22 is, for example, 5V as opposed to, for example, 12V. At relatively high current levels, the efficiency of the controller 25 is greater if the gate drive signal 22 is 12V as opposed to 5V. In accordance with various embodiments, the gate drive selector 20 of the voltage regulator 12 selects the gate drive signal 22 to be a particular voltage from among multiple input voltages (e.g., input voltages 18 and 19) based on the current draw of the processor 30. If the current draw of the processor is relatively low, the gate drive selector 20 selects the gate drive signal 22 to be 5V. If the current draw of the processor is relatively high, the gate drive selector 20 selects the gate drive signal 22 to be 12V. In this way, the efficiency of the voltage regulator 12 is increased over a wide dynamic range of load currents.

In some embodiments, the BIOS 36 asserts the BIOS gate drive select signal 39 to force the gate drive selector 20 to select one or the other of the input voltages 18, 19. In other embodiments or in combination with the aforementioned operation of the BIOS 36, the gate drive selector 20 of FIG. 2 receives the average current signal 32 from the controller 25. The average current signal 32 is indicative of the current draw of the processor 30. The average current signal 32 is provided as an input to op amp 40. On the basis of the average current signal 32, as amplified by op amp 40, the comparator comprising op amp 42 selects one of the two possible input voltages 18 or 19. If the average current of the processor which is output from op amp 40 as a voltage plus the hysterisis voltage through R6 is less than Vref's reference voltage, the gate drive select signal 50 is forced low and the gate drive signal 22 is selected to be 5V (input voltage 18). If the average current of the processor which is output from op amp 40 as a voltage plus the hysterisis voltage through R6 is greater than the Vref's reference voltage, the gate drive select signal 50 is forced high and the gate drive select signal 50 is high thereby causing the gate drive signal to be 12V (input voltage 19).

Figure 3:
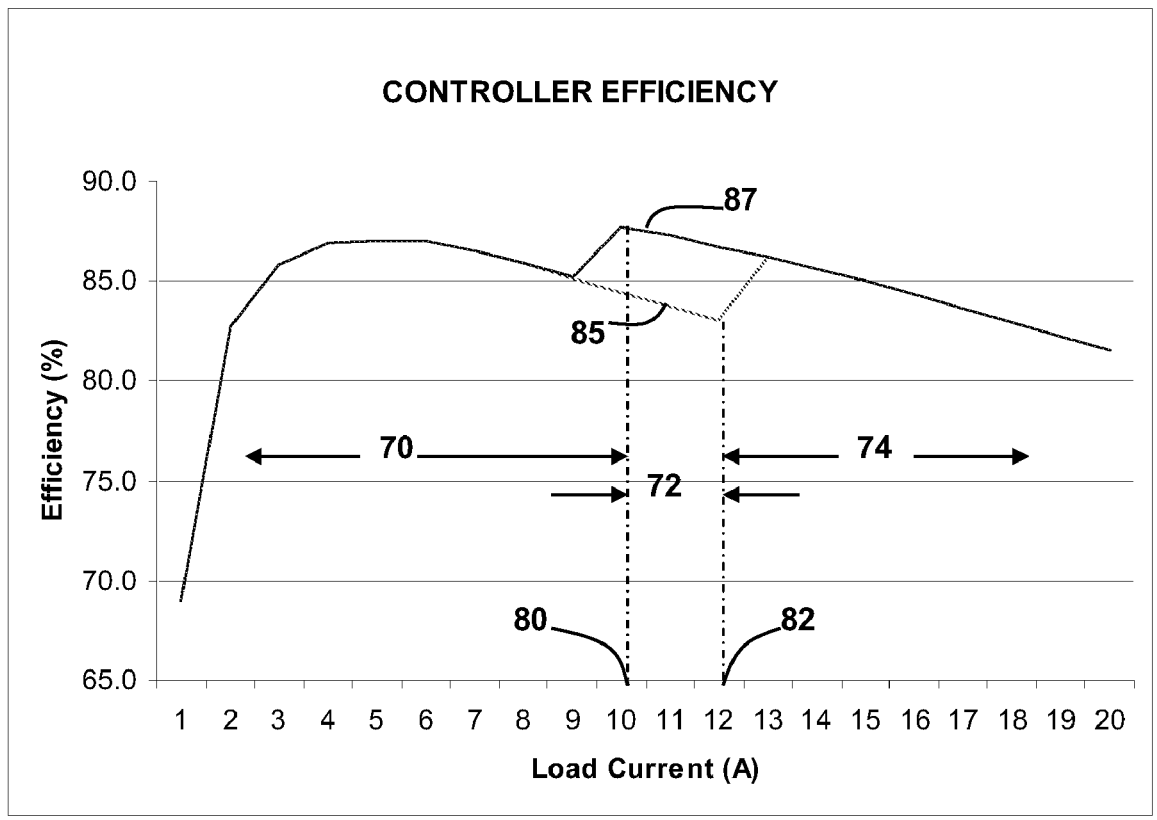
FIG. 3 illustrates the relationship between efficiency and current for the system of FIG. 1 in accordance with various embodiments.

FIG. 3 is a graph illustrating the relationship between the efficiency of the voltage regulator 12 and the current draw by the processor 30. The graph is divided into three sections 70, 72 and 74. In section 70, the processor current is relatively low and the gate drive selector 20 selects the gate drive signal 22 to be 5V. In section 74, the processor current is relatively high and the gate drive selector 20 selects the gate drive signal 22 to be 12V. Section 72 defines the hysterisis portion of the comparator (op amp 42). If the current draw by the processor is increasing from a point in section 70, the comparator will change the gate drive signal 22 from 5V to 12V upon the processor current reaching point 82. In the embodiment of FIGS. 2 and 3, point 82 is approximately 12 A. If the current draw by the processor 30 is decreasing from a point in section 74, the comparator will change the gate drive signal 22 from 12V to 5V upon the processor current reaching point 80. In the embodiment of FIGS. 2 and 3, point 80 is approximately 9 A. Accordingly, in the hysterisis section 72, either of the input voltages 18 and 19 may be used as the gate drive signal 22 depending on direction (downward or upward) that the processor current draw is changing. Graph segment 85 represents the efficiency of the voltage regulator with the 5V input voltage 18 being selected as the gate drive signal 22. Graph segment 87 represents the efficiency of the voltage regulator with the 12V input voltage 19 being selected as the gate drive signal 22.

Figure 4:
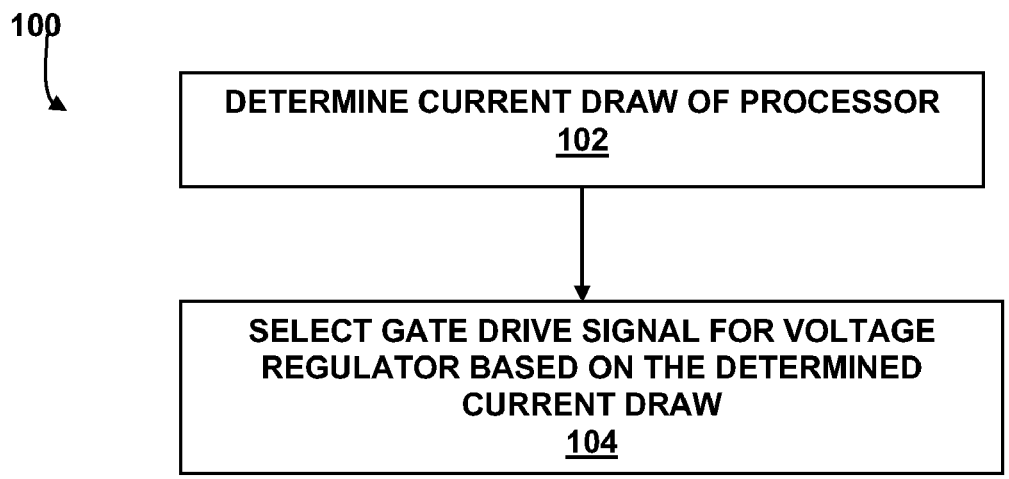
FIG. 4 shows a method in accordance with various embodiments.

FIG. 4 illustrates a method 100 for selection of the gate drive signal 22. At 102, the method comprises determining the current draw of the processor 30. At 104, the method comprises selecting the gate drive voltage for the voltage regulator 12 based on the determined current draw. In some embodiments, determining the current draw of the processor 30 comprises receiving a signal (e.g., average current signal 32) from the controller 25 indicative of the processor's current draw.

In some embodiments, the gate drive selector 22 changes the selected gate drive signal during run-time of the processor. In such embodiments, the gate drive selector 20 detects changes in the current draw of the processor 30 and selects new gate drive voltages based on the changed current draw of the processor. Thus, if the processor 30 transitions from a high current mode to a low current mode (e.g., sleep state or an operating system in an idle state), the gate drive selector 20 will detect the changed current draw and adjust the gate drive signal 22 to increase efficiency.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a load; and
   a voltage regulator configured to select a gate drive signal from among a plurality of input voltages, and to use the selected gate drive signal to turn on a power transistor to produce a regulated voltage for said load;
   a basic input/output system (BIOS) that causes a BIOS signal to be generated to said voltage regulator;
   wherein the voltage regulator selects the gate drive signal based on a current draw of said load and based on said BIOS signal.

2. The system of claim 1 wherein a controller generates an output signal indicative of an average current draw of said load.

3. The system of claim 2 wherein said voltage regulator uses said output signal to select the gate drive signal.

4. The system of claim 1 wherein said load comprises a processor, and said BIOS determines a type of said processor and causes said BIOS signal to be generated based on the determined type.

5. The system of claim 1 wherein said plurality of input voltages comprise 5V and 12V.

6. The system of claim 1 wherein said plurality of input voltages comprise 5V and 12V, and said regulated voltage is less than or equal to 1.5V.

7. The system of claim 1 wherein the voltage regulator selects said gate drive voltage during run-time of said system.

8. The system of claim 1 wherein the voltage regulator changes said gate drive voltage during run-time of said system.

9. A voltage regulator apparatus, comprising:
 a controller that controls a plurality of power transistors based, at least in part, on a gate drive signal; and
 a gate drive selector coupled to said controller, said gate drive selector selects the gate drive signal from among a plurality of input voltages, said gate drive selector selects the gate drive signal based on a level of current consumption of a load and based on a signal caused to be asserted by a system firmware.

10. The voltage regulator apparatus of claim 9 wherein said load comprises a processor.

11. The voltage regulator apparatus of claim 9 wherein said gate drive selector selects the gate drive signal based on a signal from said load indicative of a current draw of said load.

12. The voltage regulator apparatus of claim 9 wherein said gate drive selector changes the gate drive signal during run-time of a system.

* * * * *